(12) United States Patent
Mizusako

(10) Patent No.: US 8,199,275 B2
(45) Date of Patent: Jun. 12, 2012

(54) ELECTRO-OPTICAL DEVICE COMPRISING A PRISMATIC PORTION FORMED IN A SURFACE OF A FIRST SUBSTRATE AND COVERED BY A FUNCTIONAL LAYER THAT DOES NOT PROTRUDE INTO AN ELECTRO-OPTICAL LAYER

(75) Inventor: Kazuhisa Mizusako, Chino (JP)

(73) Assignee: Seiko Epson Corporation, Tokyo (JP)

( * ) Notice: Subject to any disclaimer, the term of this patent is extended or adjusted under 35 U.S.C. 154(b) by 563 days.

(21) Appl. No.: 11/684,945

(22) Filed: Mar. 12, 2007

(65) Prior Publication Data

US 2007/0247731 A1 Oct. 25, 2007

(30) Foreign Application Priority Data

Mar. 23, 2006 (JP) .................. 2006-080418

(51) Int. Cl.
*G02F 1/1335* (2006.01)
*G02F 1/1333* (2006.01)
(52) U.S. Cl. .............. 349/57; 349/95; 349/110
(58) Field of Classification Search ............ 349/95, 349/110, 57
See application file for complete search history.

(56) References Cited

U.S. PATENT DOCUMENTS

| | | | | |
|---|---|---|---|---|
| 5,666,175 A * | 9/1997 | Spitzer et al. ................ 349/95 |
| 2002/0001056 A1* | 1/2002 | Sandberg et al. ............ 349/123 |
| 2002/0180909 A1* | 12/2002 | Lubart et al. ................ 349/113 |
| 2004/0027680 A1* | 2/2004 | Ozawa ........................ 359/642 |
| 2005/0245087 A1* | 11/2005 | Sasagawa et al. ............. 438/706 |
| 2006/0098296 A1* | 5/2006 | Woodgate et al. ............ 359/642 |
| 2006/0103779 A1* | 5/2006 | Amemiya et al. ............. 349/95 |
| 2006/0114378 A1* | 6/2006 | Choi ........................... 349/110 |

FOREIGN PATENT DOCUMENTS

| JP | A 03-166518 | 7/1991 |
|---|---|---|
| JP | A 11-202311 | 7/1999 |
| JP | A 2000-330101 | 11/2000 |
| JP | A 2002-358811 | 12/2002 |
| JP | 2004347692 A * | 12/2004 |

* cited by examiner

*Primary Examiner* — Mark Robinson
*Assistant Examiner* — Paul Lee
(74) *Attorney, Agent, or Firm* — Oliff & Berridge, PLC

(57) ABSTRACT

An electro-optical device includes a first substrate; a second substrate; an electro-optical material, the electro-optical material being disposed between the first and second substrates; prismatic portions that collect light incident on the first substrate, each prismatic portion being in the form of a groove having an opening, disposed in the first substrate, and being adjacent to the electro-optical material; a functional layer that drives the electro-optical material, the functional layer being disposed on a side of the first substrate, the side being adjacent to the electro-optical material, and the functional layer extending over the openings; and first light-shielding portions disposed on the second substrate, each light-shielding portion overlapping a corresponding one of the prismatic portions when viewed in plan.

7 Claims, 8 Drawing Sheets

ELECTRO-OPTICAL DEVICE COMPRISING A PRISMATIC PORTION FORMED IN A SURFACE OF A FIRST SUBSTRATE AND COVERED BY A FUNCTIONAL LAYER THAT DOES NOT PROTRUDE INTO AN ELECTRO-OPTICAL LAYER

BACKGROUND

1. Technical Field

An aspect of the invention relates to an electro-optical device or a projector.

2. Related Art

A projection display, such as a projector, mainly include a light source; a light valve that modulates light emitted from the light source; and a projection lens that projects light modulated by the light valve onto a screen or the like. A liquid-crystal device is often used as the light valve that modulates light.

The liquid-crystal device used as the light valve has a structure in which a pair of substrates holds a liquid-crystal material therebetween. Such a liquid-crystal device is required to have high efficiency for light utilization in order to allow light from a light source to contribute to display as much as possible. For example; JP-A-2000-330101 discloses a technique for forming microlenses on a pair of substrates as a method for enhancing efficiency for light utilization. In this technique, the formation of the microlenses on each of the substrates enhances the effect of collecting light into pixel regions, thereby increasing efficiency for light utilization.

On the other hand, there are problems as follows: difficulty in alignment for adjusting the foci of the microlenses, the occurrence of loss (Fresnel loss) due to the passage of light through the plurality of microlenses, an increase in cost due to the formation of the microlenses on each substrate, and the like.

In contrast, it is known that a technique in which by bonding a prismatic substrate onto the outer side of one substrate of the pair of substrates, the prismatic substrate including prismatic elements which are each in the form of a groove and which are disposed in interpixel regions, reflecting light coming through the one substrate is reflected from the grooves of the prismatic elements into the pixel regions. This technique can collect light into the pixel regions and improve efficiency for light utilization without the occurrence of the above-described problems.

In the liquid-crystal device, the pixel regions are arrayed in a matrix. The interpixel regions include leads, active elements, and the like. Irradiation of the leads and the active elements with light causes electrical failures. Thus, the interpixel regions are usually covered with light-shielding portions. In the prismatic substrate, the opposite substrate is generally bonded on a surface in which the prismatic elements are disposed. Each of the light-shielding portions is disposed on the opposite substrate so as to overlap a corresponding one of the prismatic elements when viewed in plan.

However, in the case where the prismatic elements are disposed on the substrate, the prismatic elements are remote from the light-shielding portions by the thickness of the opposite substrate. Thus, light rays traveling obliquely to the normal to the substrate through the pixel regions, which are located between the prismatic elements, and light rays reflected from the prismatic elements and then coming through the pixel regions are partially absorbed by the light-shielding portions, in some cases. These light rays are light rays originally designed to be emitted from the liquid-crystal device and to contribute to display. Thus, efficiency for light utilization is reduced because of absorption of light. Other electro-optical devices also have this problem as well as the liquid-crystal device.

SUMMARY

An advantage of some aspects of the invention is to provide an electro-optical device having improved efficiency for light utilization and a projector.

An electro-optical device according to an aspect of the invention includes a first substrate; a second substrate; an electro-optical material, the electro-optical material being disposed between the first and second substrates; prismatic portions that collect light incident on the first substrate, each prismatic portion being in the form of a groove having an opening, disposed in the first substrate, and being adjacent to the electro-optical material; a functional layer that drives the electro-optical material, the functional layer being disposed on a side of the first substrate, the side being adjacent to the electro-optical material, and the functional layer extending over the openings; and first light-shielding portions disposed on the second substrate, each light-shielding portion overlapping a corresponding one of the prismatic portions when viewed in plan.

The term "electro-optical device" is a collective term including a device that converts electrical energy into light energy in addition to a device having the electro-optical effect in which a change in the refractive index of a material due to an electric field changes light transmittance Examples of the electro-optical device include liquid-crystal display devices using liquid-crystal materials as electro-optical materials, organic electro-luminescent (EL) devices using organic EL materials, inorganic EL devices using inorganic EL materials, and plasma display devices using plasma gases as electro-optical materials. The electro-optical device may further include electrophoretic displays (EPDs) and field-emission displays (FEDs). The term "functional layer" includes an electrode layer for applying a predetermined voltage to an electro-optical material and a lead layer connected to the electrode layer.

An electro-optical device according to an aspect of the invention includes the first substrate; the second substrate; the electro-optical material, the electro-optical material being disposed between the first and second substrates; the prismatic portions that collect light incident on the first substrate, each prismatic portion being in the form of a groove having an opening, disposed in the first substrate, and being adjacent to the electro-optical material; the functional layer that drives the electro-optical material, the functional layer being disposed on the side of the first substrate, the side being adjacent to the electro-optical material, and the functional layer extending over the openings; and the first light-shielding portions disposed on the second substrate, each light-shielding portion overlapping a corresponding one of the prismatic portions when viewed in plan. The first substrate serves as a prismatic substrate and an opposite substrate. That is, the absence of the opposite substrate having a thickness between the prismatic elements and the light-shielding portions reduces the prismatic portions and the first light-shielding portions, thereby reducing absorption of light by the first light-shielding portions to improve efficiency for light utilization.

With respect to light incident obliquely to the normal to a surface of the substrate, in the known structure, the shift distance of light in the direction perpendicular to the surface of the substrate is increased by the thickness of the opposite substrate, as compared with the structure in the invention. As a result, the shift distance of light in the direction parallel to the surface of the substrate is also increased. For example, in the known structure, light collected by the prismatic portions is excessively collected to the middle portion of each pixel region because of the increased shift distance, thereby reducing the light-transmitting region. In contrast, in the structure of the invention, light is not excessively collected to the middle portion of each pixel region because of the absence of the opposite substrate having thickness between the prismatic portions and the light-shielding portions, thereby increasing the light-transmitting region compared with the known structure. The inventive structure including the opposite substrate also serving as the prismatic substrate has a larger light-transmitting region than that in the known structure, thus substantially increasing the aperture ratio to improve efficiency for light utilization.

Furthermore, when light is excessively collected to the middle portion of each pixel region, light comes through only the middle portion of each pixel region. Thus light scarcely comes through the periphery of the pixel region, causing nonuniformity in light-intensity distribution. In contrast, in the structure of the invention, light is not excessively collected to the middle portion of the pixel region; hence, light uniformly comes through a wide range of each pixel region.

Preferably, the electro-optical device further include second light-shielding portions, each second light-shielding portion facing a corresponding one of the openings and being disposed on a side of the functional layer opposite the side adjacent to the electro-optical material.

In the invention, the electro-optical device further include the second light-shielding portions, each second light-shielding portion facing a corresponding one of the openings and being disposed on the side of the functional layer opposite the side adjacent to the electro-optical material. Thus, light other than light used for display can be surely shielded. That is, direct irradiation of a switching element and the like disposed in the electro-optical device with light can be surely inhibited, resulting in the prevention of malfunction of the electro-optical device.

An electro-optical device according to the invention includes a first substrate; a second substrate; an electro-optical material, the electro-optical material being disposed between the first and second substrates; prismatic portions that collect light incident on the first substrate, each prismatic portion being in the form of a groove having an opening, disposed in the first substrate, and being adjacent to the electro-optical material; a functional layer that drives the electro-optical material, the functional layer being disposed on a side of the first substrate, the side being adjacent to the electro-optical material, and the functional layer extending over the openings; and second light-shielding portions, each second light-shielding portion facing a corresponding one of the openings and being disposed on an opposite side of the functional layer from the electro-optical material.

According to the invention, the electro-optical device includes the first substrate; the second substrate; the electro-optical material, the electro-optical material being disposed between the first and second substrates; the prismatic portions that collect light incident on the first substrate, each prismatic portion being in the form of a groove having an opening, disposed in the first substrate, and being adjacent to the electro-optical material; the functional layer that drives the electro-optical material the functional layer being disposed on the side of the first substrate, the side being adjacent to the electro-optical material, and the functional layer extending over the openings; and the second light-shielding portions, each second light-shielding portion facing a corresponding one of the openings and being disposed on an opposite side of the functional layer from the electro-optical material. Thus, the second light-shielding portions are supported by the functional layer so as to face the openings. Therefore, for example, the second light-shielding portions are not disposed inside the prismatic portions, thus stabilizing the structure in the electro-optical device.

The electro-optical material preferably may have a higher refractive index than that of the first substrate.

According to the invention, the electro-optical material may have a higher refractive index than that of the first substrate. Thus, among light incident from the first substrate on the electro-optical material, in particular, light traveling toward the first light-shielding portions is allowed to refract toward regions between the first light-shielding portions. Therefore, light absorbed in the first light-shielding portions can be reduced to further improve efficiency for light utilization.

Preferably, the prismatic portions are each in the form of a hollow groove.

According to the invention, the prismatic portions may be each in the form of a hollow groove. Thus, the refractive index in the groove of each prismatic portion is significantly lower than that of the first substrate. As a result, the grooves of the prismatic portions can totally reflect light. In this way, a reduction in loss of light in the prismatic portions improves efficiency for light utilization.

A filling having a lower refractive index than that of the first substrate is preferably disposed in the groove of each prismatic portion.

According to the invention, the filling having a lower refractive index than that of the first substrate may be disposed in the groove of each prismatic portion. As a result, the grooves of the prismatic portions can totally reflect light, thereby improving efficiency for light utilization. Furthermore, the functional layer is disposed on the filling in the grooves, resulting in the prevention of failures of the functional layer and malfunctions of the electro-optical device. Furthermore, when the functional layer and the like are directly formed on the prismatic portions, advantageously, the layer and the like can be easily formed.

A filling containing a light-reflecting material may be preferably disposed in the groove of each prismatic portion.

According to the invention, the filling containing the light-reflecting material may be disposed in the groove of each prismatic portion. Thus, the grooves of the prismatic portions can reflect light at high reflectivity. Furthermore, light is not reflected on the basis of the difference in refractive index between the first substrate and each prismatic portion but is reflected by the filling containing the light-reflecting material. Thus, it is possible to surely reflect light at constant reflectivity, regardless of the incident angle of light incident on the groove of each prismatic portion, thereby improving efficiency for light utilization.

A projector according to the invention includes the electro-optical device described above.

According to the invention, the projector includes the electro-optical device having improved efficiency for light utilization. Therefore, it is possible to provide a projector capable of displaying a bright, high-contrast image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Projector

The schematic structure of a projector according to a first embodiment of the invention will be described below.

Figure 1:
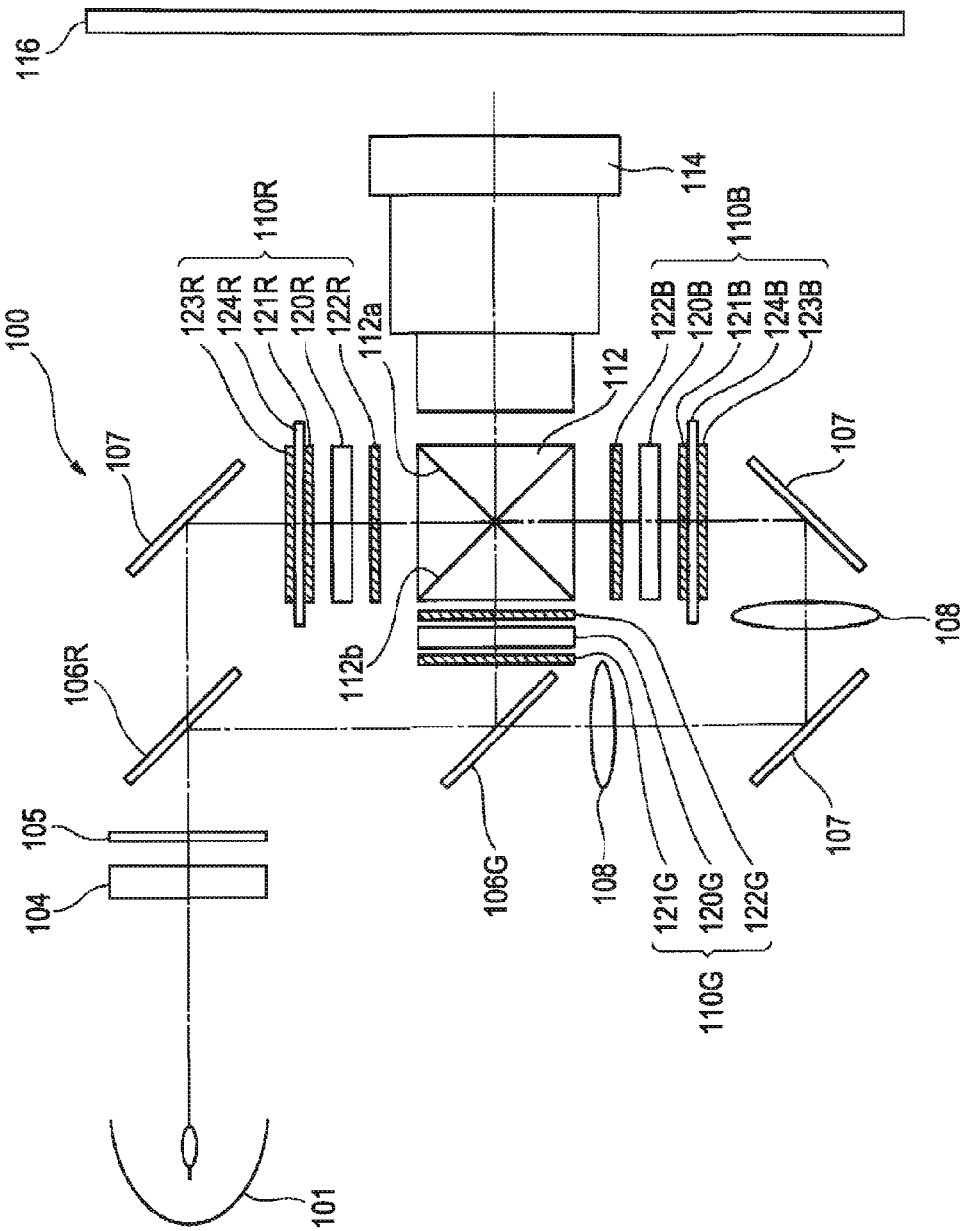
FIG. 1 schematically shows an overall structure of a projector according to a first embodiment of the invention.

As shown in FIG. 1, an ultrahigh-pressure mercury lamp 101 as a light source emits light including a red light component (hereinafter, referred to as "R light") as a first color light component, a green light component (hereinafter, referred to as "G light") as a second color light component, and a blue light component (hereinafter, referred to as "B light") as a third color light. An integrator 104 uniformizes illuminance distribution of light from the ultrahigh pressure mercury lamp 101. Light having uniformized illuminance distribution is converted by a polarization converter 105 into polarized light, for example, s-polarized light having a specific vibration direction. The resulting s-polarized light is incident on an R-light-transmitting dichroic mirror 106R constituting a color separating optical system. Hereinafter, R light will be described. The R-light-transmitting dichroic mirror 106R transmits R light and reflects G light and B light. R light coming through the R-light-transmitting dichroic mirror 106R is incident on a reflecting mirror 107. The reflecting mirror 107 bends the optical path of R light at an angle of 90°. R light in which the optical path has been bent is incident on a first-color-light spatial modulator 110R that modulates R light, which is the first color light, in response to an image signal. The first-color-light spatial modulator 110R is a transmissive liquid-crystal display device that modulates R light in response to the image signal. The transmission of light through the dichroic mirror does not change the direction of polarization of light, thus maintaining R light incident on the first-color-light spatial modulator 110R at s-polarized light.

The first-color-light spatial modulator 110R includes a half-wave plate 123R, a glass plate 124R, a first polarizing plate 121R, a liquid-crystal panel 120R, and a second polarizing plate 122R. The detailed structure of the liquid-crystal panel 120R will be described later. The half-wave plate 123R and the first polarizing plate 121R are in contact with the light-transmitting glass plate 124R that does not change the polarization direction, thereby inhibiting the deformation of the first polarizing plate 121R and the half-wave plate 123R due to heat generation. In FIG. 1, the second polarizing plate 122R is independently disposed. Alternatively, the second polarizing plate 122R may be contact with the outgoing light side of the liquid-crystal panel 120R or the incident light side of a cross dichroic prism 112.

s-Polarized light incident on the first-color-light spatial modulator 110R is converted by the half-wave plate 123R into p-polarized light. R light converted into p-polarized light comes through the glass plate 124R and the first polarizing plate 121R without change and is then incident on the liquid-crystal panel 120R. p-polarized R light incident on the liquid-crystal panel 120R is converted by modulation in response to an image signal into S-polarized light. R light converted by modulation through the liquid-crystal panel 120R into s-polarized light emerges from the second polarizing plate 122R. In this way, R light modulated through the first-color-light spatial modulator 110R is incident on the cross dichroic prism 112, which is a color combining optical system.

G light will be described below. G light and B light are reflected from the R-light-transmitting dichroic mirror 106R. As a result, the optical path of G light and B light are bent at an angle of 90°. G light and B light in which the optical path thereof has been bent are incident on a B-light-transmitting dichroic mirror 106G. The B-light-transmitting dichroic mirror 106G reflects G light and transmits B light. G light reflected from the B-light-transmitting dichroic mirror 106G is incident on a second-color-light spatial light modulator 110G that modulates G light, which is the second color light component, in response to an image signal. The second-color-light spatial light modulator 110G is a transmissive liquid-crystal display device that modulates G light in response to the image signal. The second-color-light spatial light modulator 110G includes a liquid-crystal panel 120G, a first polarizing plate 121G, and a second polarizing plate 122G. The liquid-crystal panel 120G will be described in detail later.

G light converted into s-polarized light is incident on the second-color-light spatial light modulator 110G. s-Polarized light incident on the second-color-light spatial light modulator 110G transmits the first polarizing plate 121G without change and is then incident on the liquid-crystal panel 120G. s-Polarized G light incident on the liquid-crystal panel 120G is converted by modulation in response to an image signal into p-polarized light. G light converted by modulation through the liquid-crystal panel 120R into p-polarized light emerges from the second polarizing plate 122G. In this way, G light modulated through the second-color-light spatial light modulator 110G is incident on the cross dichroic prism 112, which is a color combining optical system.

B light will be described below. B light coming through the B-light-transmitting dichroic mirror 106G is incident on a third-color-light spatial light modulator 110B that modulates B light, which is the third color light component, in response to an image signal through two relay lenses 108 and two reflecting mirrors 107. The third-color-light spatial light modulator 110B is a liquid-crystal display device that modulates B light in response to the image signal.

The reason for allowing B light to comes through the relay lenses 108 is that the length of the optical path of B light is longer than each of those of R light and G light. The use of the relay lenses 108 can bring B light coming through the B-light-transmitting dichroic mirror 106G to the third-color-light spatial light modulator 110B without change. The third-color-light spatial light modulator 110B includes a half-wave plate 123B, a glass plate 124B, a first polarizing plate 121B, a liquid-crystal panel 120B, and a second polarizing plate 122B. The third-color-light spatial light modulator 110B has a structure similar to that of the first-color-light spatial modulator 110R. Thus, the detailed description is omitted.

B light converted into s-polarized light is incident on the third-color-light spatial light modulator 110B. s-Polarized light incident on the third-color-light spatial light modulator 110B is converted by the half-wave plate 123B into p-polarized light. B light converted into p-polarized light comes through the glass plate 124B and the first polarizing plate 121B without change and is then incident on the liquid-crystal panel 120B. p-Polarized B light incident on the liquid-crystal panel 120B is converted by modulation in response to an image signal into s-polarized light. B light converted by modulation through the liquid-crystal panel 120B into s-polarized light emerges from the second polarizing plate 122B. B light modulated through the third-color-light spatial light modulator 110B is incident on the cross dichroic prism 112, which is a color combining optical system. In this way, the R-light-transmitting dichroic mirror 106R and the B-light-transmitting dichroic mirror 106G, which constitute color separating optical systems, separate light emitted from the ultrahigh pressure mercury lamp 101 into R light as the first color light component, G light as the second color light component, and B light as the third color light component.

The cross dichroic prism 112, which is a color combining optical system, includes two dichroic films 112*a* and 112*b*, the dichroic film 112*a* being orthogonal to the dichroic film 112*b*. The dichroic film 112*a* reflects B light and transmits G light. The dichroic film 112*b* reflects R light and transmits G light. In this way, the cross dichroic prism 112 combines R light, G light, and B light which are modulated through the first-color-light spatial modulator 110R, the second-color-light spatial light modulator 110G, and the third-color-light spatial light modulator 110B, respectively.

A projection lens 114 projects light combined through the cross dichroic prism 112 onto a screen 116. Thereby, a full-color image can be obtained on the screen 116.

As described above, light components incident from the first-color-light spatial light modulator 110R and the third-color-light spatial light modulator 110B on the cross dichroic prism 112 are adjusted to be s-polarized light components. Light incident from the second-color-light spatial light modulator 110G on the cross dichroic prism 112 is adjusted to be p-polarized light. In this way, the light components emitted from these color light spatial light modulators are efficiently combined in the cross dichroic prism 112 by allowing the polarization directions of light components incident on the cross dichroic prism 112 to differs. The dichroic films 112*a* and 112*b* usually have satisfactory reflection properties of s-polarized light. Thus, R light and B light which are reflected from the dichroic films 112*a* and 112*b* are each modified to be s-polarized light. G light which transmits the dichroic films 112*a* and 112*b* is modified to be p-polarized light.

Liquid-Crystal Panel

Figure 2:
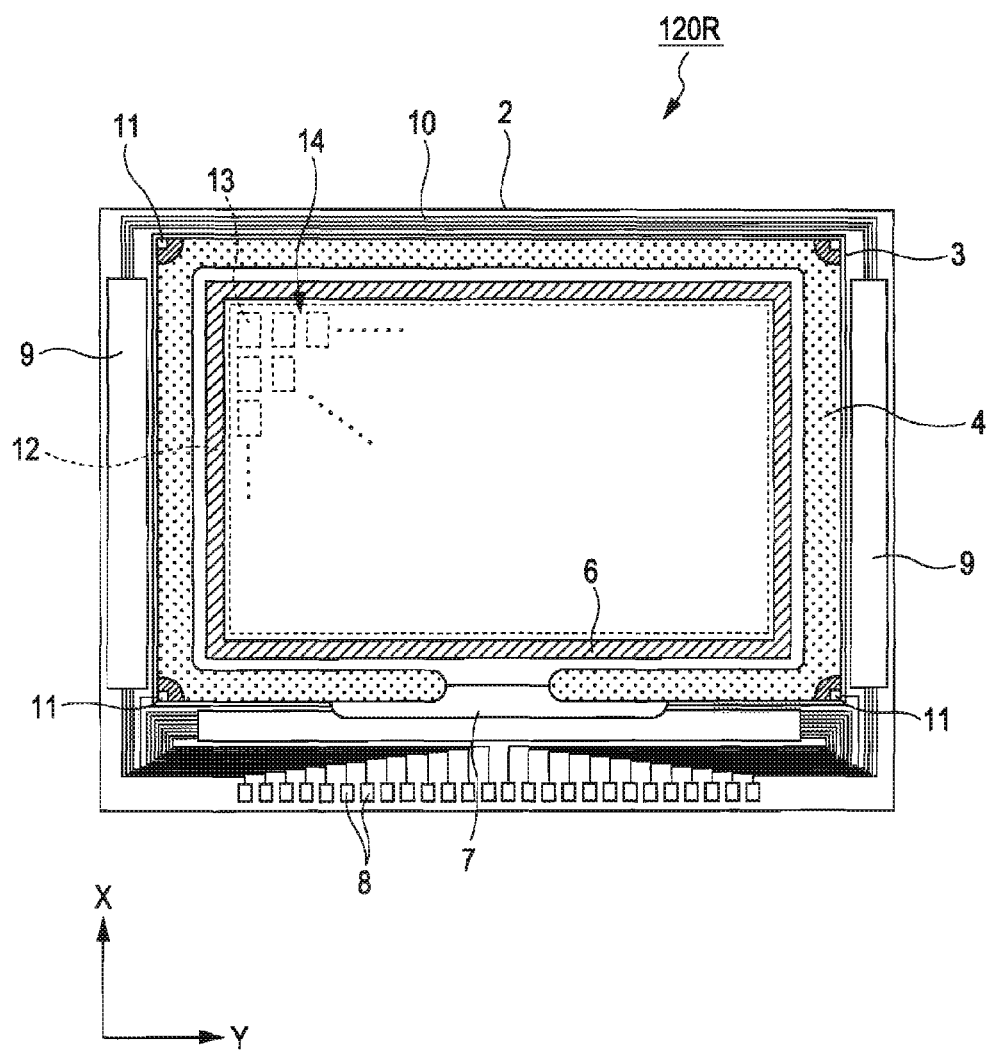
FIG. 2 is a plan view illustrating the structure of a liquid-crystal panel according to the embodiment.
Figure 3:
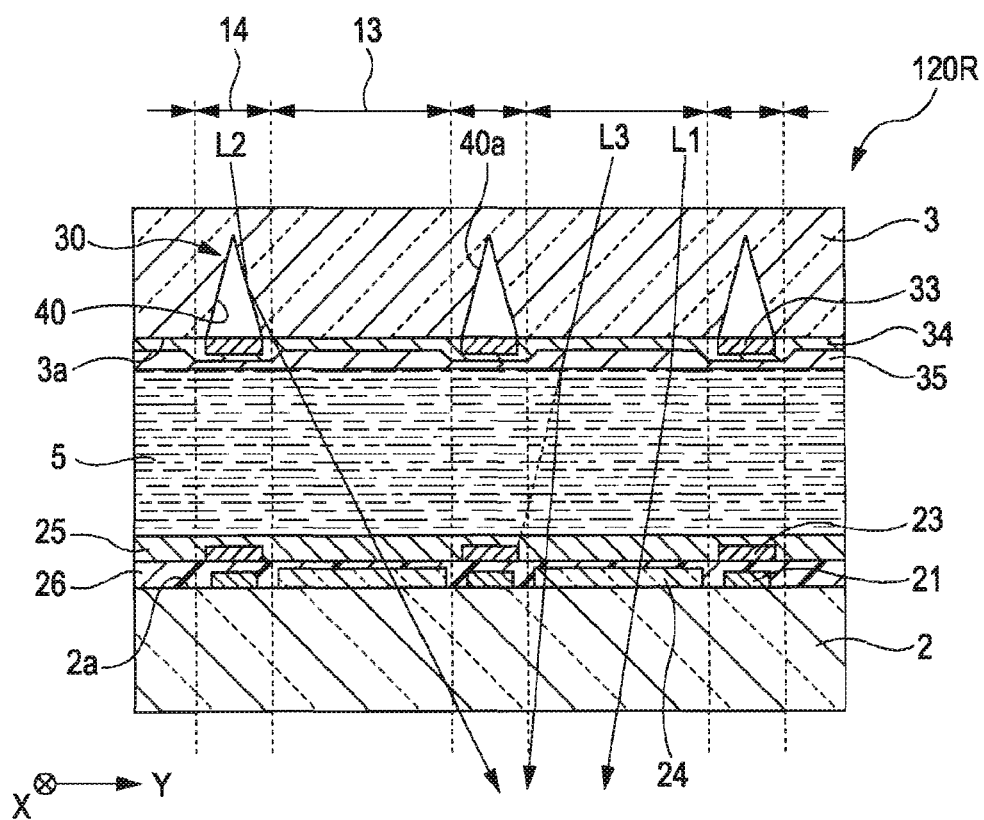
FIG. 3 is a cross-sectional view illustrating the structure of the liquid-crystal panel according to the embodiment.

The liquid-crystal panel (electro-optical device) will be described in detail below with reference to FIGS. 2 and 3. A projector described in FIG. 1 includes three liquid-crystal panels 120R, 120G, and 120B. These three liquid-crystal panels 120R, 120G, and 120B have the same basic configuration but differ in wavelength range of light modulated from each other. Hence, the liquid-crystal panel 120R as an example will be described below. FIG. 2 is a plan view of the structure of the liquid-crystal panel 120R. FIG. 3 is a cross-sectional view of the liquid-crystal panel 120R. In FIGS. 2 and 3, the X-direction shown is defined as the transverse direction of the liquid-crystal panel 120R. The Y-direction is defined as longitudinal direction of the liquid-crystal panel 120R.

As shown in FIG. 2, the liquid-crystal panel 120R includes a TFT-array substrate 2 and an opposite substrate 3 which are composed of a transparent material such as glass; and a seal 4, the TFT-array substrate 2 and the opposite substrate 3 being laminated with the seal 4 provided therebetween. A liquid-crystal layer 5 is disposed in a region surrounded by the seal 4. The TFT-array substrate 2 and the opposite substrate 3 each have a refractive index of about 1.46.

A peripheral partition 6 composed of a light-shielding material is disposed at an inner side of the seal 4. A region surrounded by the peripheral partition 6 is defined as an optical modulation region 12 for modulating light from the ultrahigh pressure mercury lamp 101. Pixel regions 13 capable of transmitting light from the ultrahigh pressure mercury lamp 101 are arrayed in a matrix in the optical modulation region 12. Regions disposed between the pixel regions 13 are defined as interpixel regions 14 for shielding light from the ultrahigh pressure mercury lamp 101.

A data-line driving circuit 7 and an external-circuit mounting terminals 8 are disposed along a first side of the TFT-array substrate 2 and in a region outside the seal 4. Scanning-line driving circuits 9 are each disposed along a corresponding one of the sides adjoining to the first side. A plurality of lines 10 for connection of the scanning-line driving circuits 9 disposed at both sides of an image-displaying region are disposed along the remaining side of the TFT-array substrate 2. Inter-substrate conductors 11 for electrically connecting the TFT-array substrate 2 to the opposite substrate 3 are disposed at corners of the opposite substrate 3.

In place of the formation of the data-line driving circuit 7 and the scanning-line driving circuits 9 on the TFT-array substrate 2, for example, a tape automated bonding substrate (TAB substrate) mounting a driving LSI may be electrically and mechanically connected to terminals disposed at the periphery of the TFT-array substrate 2 via an anisotropic conductive film.

As shown in FIG. 3, the TFT-array substrate 2 includes pixel electrodes 24, thin film transistors (TFTs) 21, a planarization layer 26, light-shielding portions 23, and an alignment layer 25. The pixel electrodes 24 are disposed in the pixel reactions 13 on the inner surface 2*a* of the TFT-array substrate 2. The pixel electrodes 24 are each composed of a transparent conductive material such as indium tin oxide (ITO). The TFTs 21 functions as switching elements for feeding the pixel electrodes 24 with electric signals. The TFTs 21 are disposed in the interpixel regions 14 on the inner surface 2*a* of the TFT-array substrate 2. The planarization layer 26 is composed of a transparent resin material or the like. The planarization layer 26 is disposed on substantially the entire surface of the inner surface 2*a* so as to cover the pixel electrodes 24 and the TFTs 21. The light-shielding portions 23 are disposed in the interpixel regions 14 on the planarization layer 26. The alignment layer 25 is stacked on the planarization layer 26 so as to cover the light-shielding portions 23.

As shown in FIG. 3, the opposite substrate 3 includes grooves 40, light-shielding portions 33, a common electrode 34, and an alignment layer 35.

Figure 13:
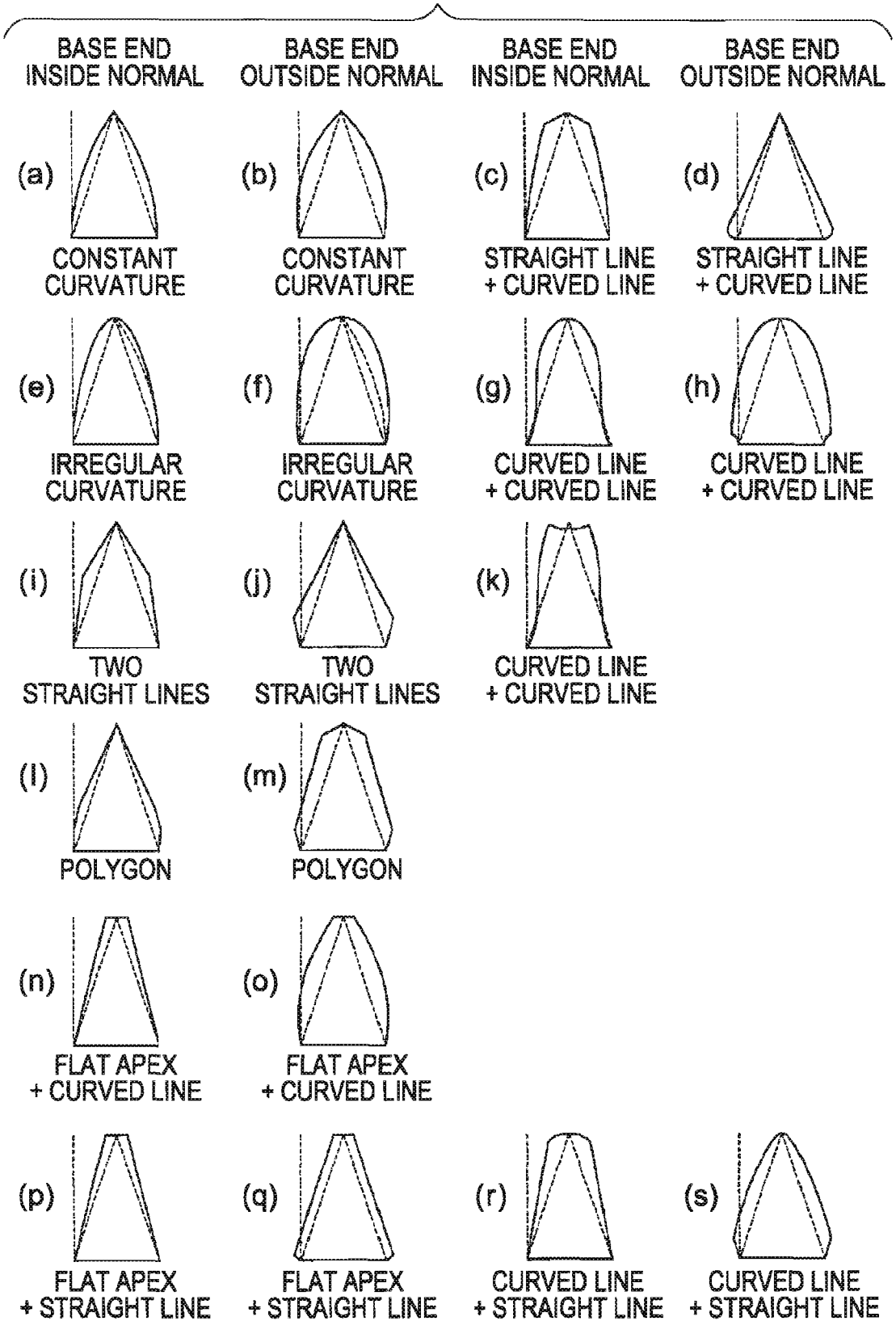
FIG. 13 shows cross-sectional views each illustrating the fragmentary structure of a prismatic element of a liquid-crystal device according to the invention.

The grooves 40 are disposed in the interpixel regions 14 and on the inner surface 3a of the opposite substrate 3. The grooves 40 are arrayed in the form of a grid so as to extend in the X-direction and Y-direction at regular intervals. The grooves 40 are disposed so as to overlap the light-shielding portions 23 when viewed in plan. The cross-sectional shape of each groove 40 is an isosceles triangle. The grooves 40 each have a hollow structure. The refractive index in each groove 40 is about 1.00. Thus, the refractive index (about 1.00) in each groove 40 differs from the refractive index (about 1.46) in the opposite substrate 3. The difference in refractive index results in total reflection of light incident from the opposite substrate 3 on the grooves 40. The grooves 40 arrayed in the form of a grid and extending in the X-direction and Y-direction constitute prismatic elements 30 functioning as optical-path deflecting portions. In this embodiment, the cross-sectional shape of each groove 40 is an isosceles triangle but is not limited thereto. For example, the cross-sectional shape may be a shape shown in FIG. 13. Furthermore, also in embodiments described below, the cross-sectional shape of each prismatic portion is not limited to an isosceles triangle but may be a shape shown in FIG. 13.

The light-shielding portions 33 are light-shielding member directly disposed on the grooves 40 so as to cover the grooves 40. Each light-shielding portion 33 has the same width as that of a corresponding one of the grooves 40. Each groove 40 overlaps a corresponding one of the light-shielding portions 33 when viewed in plan. The common electrode is directly disposed on the inner surface 3a of the opposite substrate 3 so as to cover the light-shielding portions 33. The alignment layer 35 is disposed on the surface of the common electrode 34.

The gap between the TFT-array substrate 2 and the opposite substrate 3 is filled with the liquid-crystal layer 5. The liquid-crystal layer 5 is composed of a liquid-crystal compound, such as a fluorine-containing liquid-crystal compound or fluorine-free liquid-crystal compound. The liquid-crystal layer 5 is held between the TFT-array substrate 2 and the opposite substrate 3 so as to be in contact with the alignment layer 25 adjacent to the TFT-array substrate 2 and the alignment layer 35 adjacent to the opposite substrate 3. The orientation of liquid crystal molecules is regulated by the alignment layer 25 and the alignment layer 35 in such a manner that the liquid-crystal molecules are aligned in a predetermined direction when a non-selective voltage is applied. The liquid-crystal layer 5 has a refractive index of about 1.75. That is, the liquid-crystal layer 5 has a refractive index higher than refractive index (about 1.46) of each of the TFT-array substrate 2 and the opposite substrate 3.

Light L1 from the ultrahigh pressure mercury lamp 101 is incident from the upper side in FIG. 3 on the liquid-crystal panel 120R. The incident light comes through the side of the opposite substrate 3 (the opposite substrate 3, the common electrode 34, and alignment layer 35), is modulated by the liquid-crystal layer 5, and comes through the side of the TFT-array substrate (the alignment layer 25, the planarization layer 26, the pixel electrodes 24, and the TFT-array substrate 2). Light coming through the TFT-array substrate 2 travels toward the projection lens 114 (see FIG. 1).

Light L2 from the ultrahigh pressure mercury lamp 101 is incident on the opposite substrate 3 in the same way as light L1. Light L2 traveling in the opposite substrate 3 is totally reflected from an inclined face 40a of the groove 40 toward the pixel regions 13 to deflect the optical path. Light L2 reflected from the inclined face 40a travels similarly to light L1, comes through the TFT-array substrate 2, and travels toward projection lens 114 (see FIG. 1).

Light L3 from the ultrahigh pressure mercury lamp 101 is incident on the opposite substrate 3 in the same way as light L1, comes through the side of the opposite substrate, and is incident on the liquid-crystal layer 5. Light L3 refracts toward the inner side of the pixel region 13 because the liquid-crystal layer 5 has a refractive index (1.75) higher than the refractive index (about 1.46° of the opposite substrate 3. Even light (indicated by a dashed line in FIG. 3) as light L3 in which if light travels straight, light is incident on the light-shielding portion 23 to be absorbed therein contributes to display.

Production Process

Referring to FIGS. 4 to 7, a process for forming the opposite substrate 3 of the liquid-crystal panel 120R will be described below. FIGS. 4 to 7 are each a cross-sectional view of a structure in each step of the process for forming the opposite substrate 3.

Figure 4:
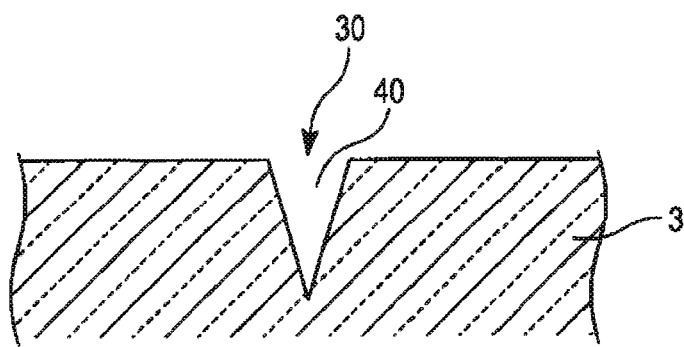
FIG. 4 is a process drawing showing a step of producing an opposite substrate of the liquid-crystal panel according to the embodiment.
Figure 5:
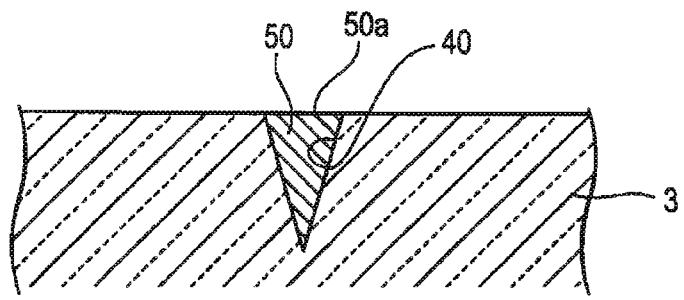
FIG. 5 is a process drawing showing a step of producing an opposite substrate of the liquid-crystal panel according to the embodiment.

As shown in FIG. 4, the groove 40 of the prismatic element 30 is formed in the opposite substrate 3. The groove 40 is formed by, for example, dry-etching the opposite substrate 3. As shown in FIG. 5, a volatile solid member 50 is charged into the groove 40. The volatile solid member 50 is composed of a material which is in the form of a solid at room temperature and, for example, evaporates at about 200° C., e.g., paraffin. The surface 50a of the volatile solid member 50 is flush with the surface 3a of the opposite substrate 3.

Figure 6:
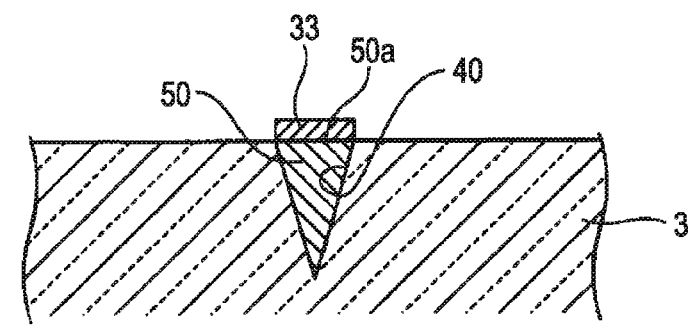
FIG. 6 is a process drawing showing a step of producing an opposite substrate of the liquid-crystal panel according to the embodiment.
Figure 7:
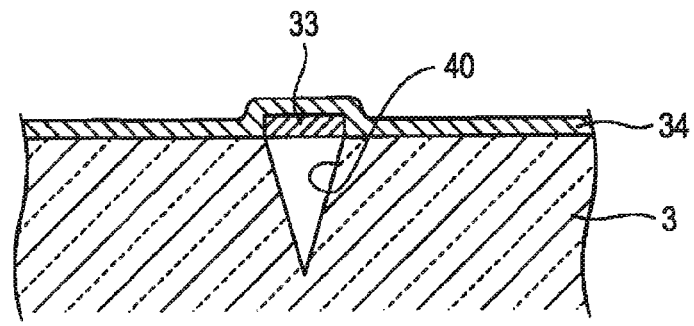
FIG. 7 is a process drawing showing a step of producing an opposite substrate of the liquid-crystal panel according to the embodiment.

As shown in FIG. 6, the light-shielding portion 33 is formed on the surface 50a of the volatile solid member 50 in such a manner that the light-shielding portion 33 has the same width as that of the surface 50a of the volatile solid member 50. As shown in FIG. 7, the common electrode 34 is formed so as to cover the surface 3a of the opposite substrate 3 and the light-shielding portion 33. In the step of forming the common electrode 34, an ITO film constituting the common electrode 34 is formed on the opposite substrate 3. At this time, the ambient temperature around the opposite substrate 3 is about 300° C.; hence, the volatile solid member 50 evaporates to form the hollow groove 40. Then, an alignment layer is formed on the common electrode 34 to complete the opposite substrate 3.

In the liquid-crystal panel 120R according to this embodiment, the common electrode 34 and the light-shielding portions 33 are directly disposed on the surface 3a of the opposite substrate 3 and the prismatic elements 30. The liquid-crystal panel 120R does not include a portion corresponding to the known structure. In this embodiment, the absence of the opposite substrate having a thickness between the prismatic elements and the light-shielding portions reduces the distance between each prismatic element 30 and a corresponding one of the light-shielding portions 23, thereby reducing absorption of light by the light-shielding portions 23 and 33 to improve efficiency for light utilization.

Furthermore, in a structure in which the opposite substrate also serves as a prismatic substrate like this embodiments the pixel regions are substantially expanded compared with the known structure.

Figure 8:
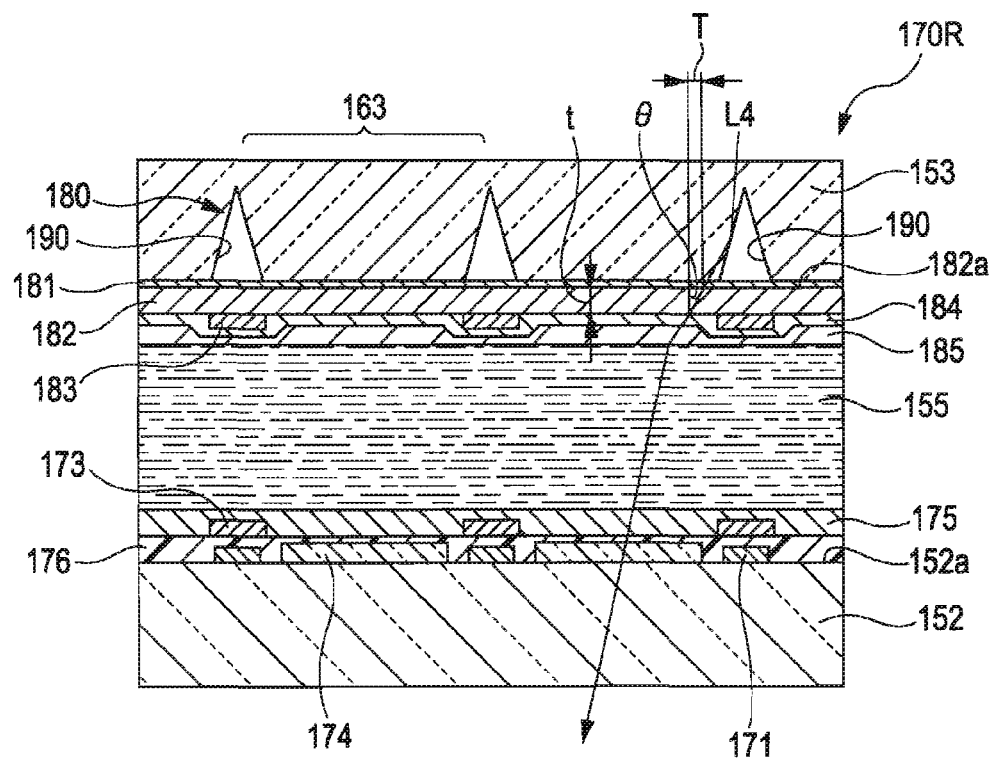
FIG. 8 is a cross-sectional view illustrating the structure of a liquid-crystal panel including a prismatic substrate bonded to an opposite substrate.
Figure 9:
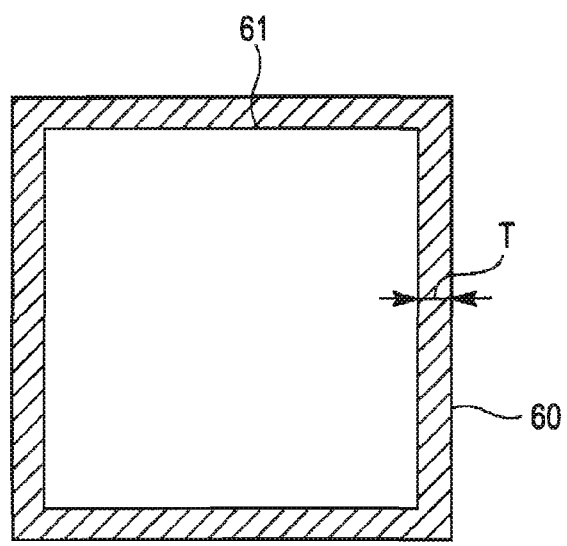
FIG. 9 schematically shows a pixel region of a liquid-crystal panel.

This point will be described with reference to FIGS. 8 and 9. FIG. 8 illustrates the structure of a known liquid-crystal panel 170R including a prismatic substrate bonded to the outer surface of an opposite substrate. FIG. 9 shows comparison between the light-transmitting region of the liquid-crystal panel 120R according to this embodiment and the light-transmitting region of the known liquid-crystal panel 170R.

As shown in FIG. 8, the liquid-crystal panel 170 includes a prismatic substrate 153 bonded on the outer surface 182a of an opposite substrate 182 having a thickness of t with an adhesive layer 181. Light-shielding portions 183 are disposed on the opposite substrate 182 and in interpixel regions. A common electrode 184 is disposed on substantially the entire surface of the opposite substrate 182 and covers the light-shielding portions 183. An alignment layer 185 is disposed on a surface of the common electrode 184.

Light L4 with which the liquid-crystal panel 170R is irradiated is incident from the upper side in FIG. 8 on the prismatic substrate 153 and reflected from a groove 190 in the prismatic substrate 153. Light L4 comes through the adhesive layer 181, the opposite substrate 182, the common electrode 184, and the alignment layer 185, is incident on a liquid-crystal layer 155 to be modulated in the liquid-crystal layer 155, and then emerges from a TFT-array substrate 152.

Light L4 is reflected from the groove 190 of a prismatic element 180 and then comes through the opposite substrate 182; hence, a shift distance in a direction parallel to the surface of the substrate, i.e., the shift distance toward the inner side of a pixel region 163 is increased. In the opposite substrate 182, light L4 shifts toward the inner side of the pixel region 163 by distance T (T=t×tan θ, wherein θ represents an incident angle when light L4 is incident on the opposite substrate 182). In contrast, in the liquid-crystal panel 120R according to this embodiment, since the opposite substrate also serves as the prismatic substrate, light does not shift in a direction parallel to the surface of the substrate, i.e., there is no shift of light corresponding to distance T described above.

Therefore, a light-transmitting region 60 of the liquid-crystal panel 120R according to this embodiment is substantially larger than a light-transmitting region 61 of the liquid-crystal panel 170R by distance T as shown in FIG. 9. Accordingly, in this embodiment in which the opposite substrate also serves as the prismatic substrate, light-transmitting region is large to substantially increase an aperture ratio, thereby improving efficiency for light utilization.

Furthermore, when the light-transmitting region 61 is small like the known liquid-crystal panel 170R, light comes through only the middle portion of the pixel region. Thus, light scarcely comes through the periphery of the pixel region, causing nonuniformity in light-intensity distribution. In contrast, the liquid-crystal panel 120R according to this embodiment has a large light-transmitting region 60; hence, light uniformly comes through a wide range of each pixel region 13.

In this embodiment, since the prismatic elements 30 have the hollow grooves 40, the refractive index in the groove 40 of each prismatic elements 30 is smaller than that of the opposite substrate 3. Thus, it is possible to totally reflect light from the grooves 40. A reduction in loss of light due to the prismatic elements 30 results in the improvement of efficiency for light utilization.

Furthermore, in this embodiment, the liquid-crystal layer 5 has a refractive index higher than that of the opposite substrate 3. As a result, among light incident from the opposite substrate 3 on the liquid-crystal layer 5, in particular, light traveling toward the light-shielding portions 23 is allowed to refract toward the inner side of each pixel region 13. Even light in which if light travels straight, light is incident on the light-shielding portion 23 to be absorbed therein contributes to display; hence, efficiency for light utilization can be further improved.

Second Embodiment

A second embodiment of the invention will be described below.

Figure 10:
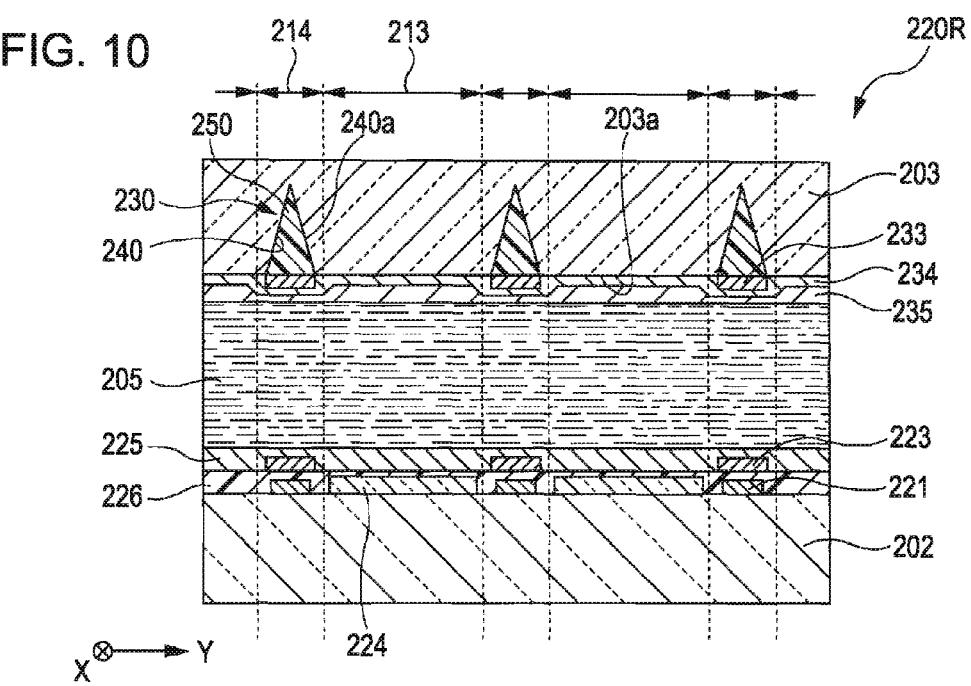
FIG. 10 is a cross-sectional view illustrating the structure of a liquid-crystal panel according to a second embodiment of the invention.

As shown in FIG. 10, a liquid-crystal panel 220R according to this embodiment has the same structure as in the first embodiment, except that a transparent filling 250 is disposed in grooves 240 disposed in an opposite substrate 203. The filling 250 is composed of an acrylic resin material or the like. The filling 250 has a refractive index of about 1.40, which is smaller than the refractive index (about 1.46) of the opposite substrate 203. Thus, light can be totally reflected from inclined faces 240a of the grooves 240.

The filling 250 may be composed of a transparent resin material, such as an epoxy resin, a melamine resin, or a polyimide resin, in addition to the acrylic resin. The acrylic resin is suitably used because the acrylic resin containing a precursor or a photosensitizing agent (photopolymerization initiator) is easily cured for a short time by light irradiation. Furthermore, a UV curable resin has low shrinkage on curing and is thus effective in ensuring reliability and morphological stability of prismatic elements 230. Examples of the basic structure of the acrylic resin include prepolymers, oligomers, monomers, and photopolymerization initiators.

Examples of the prepolymers and oligomers include acrylates, such as epoxy acrylates, urethane acrylates, polyester acrylates, polyether acrylates, and spiroacetal acrylates; and methacrylates, such as epoxy methacrylates, urethane methacrylates, polyester methacrylates, and polyether methacrylates.

Examples of the monomers include monofunctional monomers, such as 2-ethylhexyl acrylate, 2-ethylhexyl methacrylate, 2-hydroxyethyl acrylate, 2-hydroxymethyl methacrylate, N-vinyl-2-pyrrolidone, carbitol acrylate, tetrahydrofurfuryl acrylate, isobornyl acrylate, dicyclopentenyl acrylate, and 1,3-butanediol acrylate; bifunctional monomers, such as 1,6-hexanediol diacrylate, 1,6-hexanediol dimethacrylate, neopentyl glycol diacrylate, polyethylene glycol diacrylate, and pentaerythritol diacrylate; and multi-functional monomers, such as trimethylolpropane triacrylate, trimethylolpropane trimethacrylate, pentaerythritol triacrylate, and di pentaerythritol hexaacrylate.

Examples of the photopolymerization initiators include acetophenones such as 2,2-dimethoxy-2-phenylacetophenone; butylphenones, such as α-hydroxyisobutylphenone and p-isopropyl-α-hydroxyisobutylphenone; halogenated acetophenones, such as p-tert-butyldichloroacetophenone, p-tert-butyltrichloroacetophenone, and α,α-dichloro-4-phenoxyacetophenone; benzophenones, such as benzophenone and N,N-tetraethyl-4,4-diaminobenzophenone; benzils, such as benzil and benzylmethyl methyl ketal; benzoins, such as benzoin and benzoin alkyl ethers; oximes such as 1-phenyl-1,2-propanedione-2-(o-ethoxycarbonyl)oxime; xanthones, such as 2-methylthioxanthone and 2-chlorothioxanthone; and radical-generating compounds, such as Michler's ketone and benzyl methyl ketal.

A method for using a sol-gel glass material as a flowable material may be employed. A fine resin powder, a fine metal powder, a fine glass material powder, a fine ceramic powder, and a fine mineral powder; and a resin material containing at least one of the powders may be used in a production process. According to need, a compound such as an amine in order to prevent inhibition of curing due to oxygen may be incorporated. To facilitate application, a solvent may be incorporated. Examples of the solvent usable include, but are not limited to, various organic solvents, such as propylene glycol monomethyl ether acetate, methoxymethyl propionate, ethoxyethyl propionate, ethyl lactate, ethyl pyruvate, and methyl amyl ketone.

According to this embodiment, since the filling 250 having a refractive index lower than that of the opposite substrate 203 is disposed in the grooves 240 of the prismatic elements 230, light can be reflected from the inclined face 240a of the grooves 240. Thereby, efficiency for light utilization can be improved. Furthermore, the light-shielding portions 233 on the prismatic elements 230 are disposed on the filling 250, thus stabilizing shapes of the light-shielding portions 233 and preventing the failure of the light-shielding portions 233.

Third Embodiment

A third embodiment of the invention will be described below.

Figure 11:
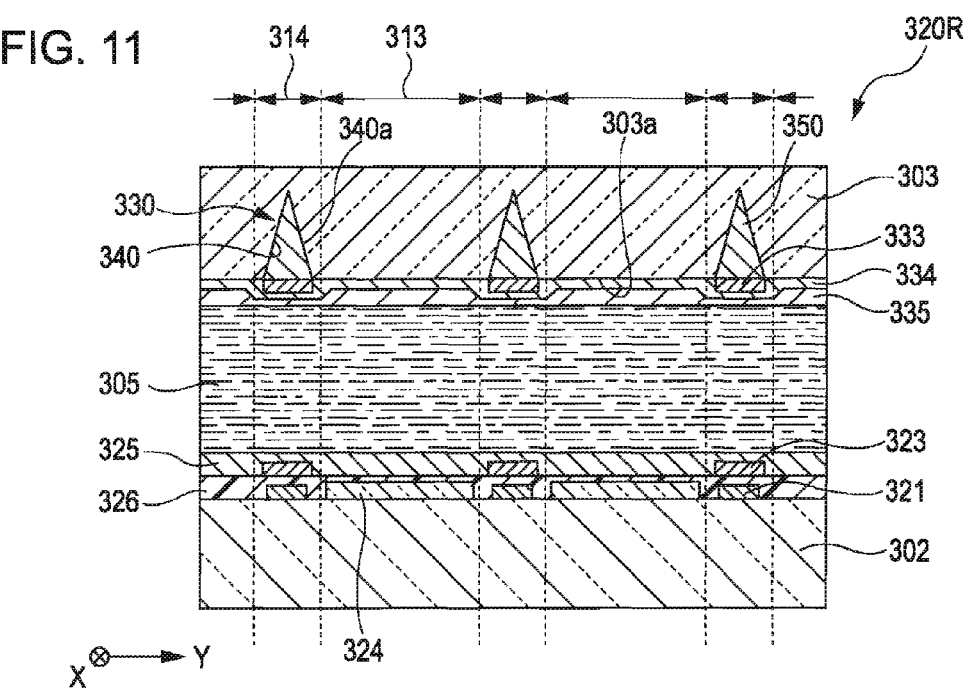
FIG. 11 is a cross-sectional view illustrating the structure of a liquid-crystal panel according to a third embodiment of the invention.

As shown in FIG. 11, a liquid-crystal panel 320R according to this embodiment has the same structure as in the first embodiments except that a filling 350 is disposed in grooves 340 disposed in an opposite substrate 303. The filling 350 contains a light-reflecting material, such as aluminum. The light-reflecting material contained in the filling 350 is preferably a metal material, such as chromium, having high reflectivity, in addition to aluminum.

According to this embodiment, the filling 350 containing the light-reflecting material is disposed in the grooves 340 of prismatic elements 330. Thus, inclined faces 340a of the groove 340 of each prismatic element 330 can reflect light at high reflectivity. Furthermore, light is not reflected on the basis of the difference in refractive index between the opposite substrate 303 and each prismatic element 330 but is reflected by the filling 350. Thus, it is possible to surely reflect light at constant reflectivity, regardless of the incident angle of light incident on the inclined faces 340a of each groove 340, thereby improving efficiency for light utilization.

Fourth Embodiment

A fourth embodiment of the invention will be described below.

Figure 12:
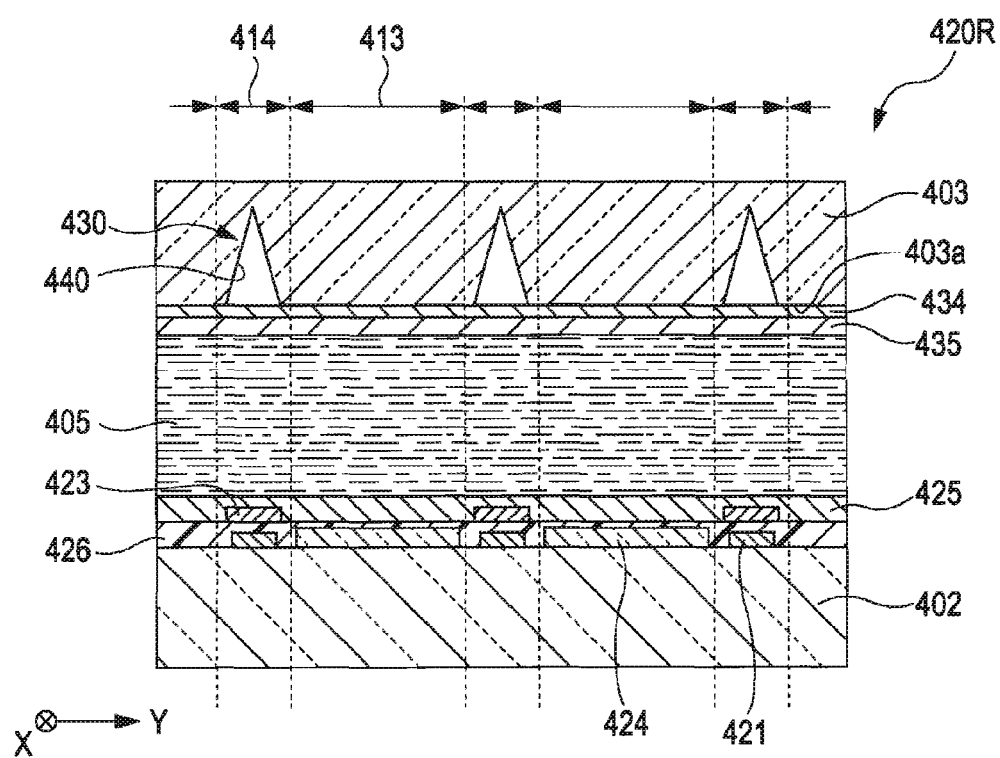
FIG. 12 is a cross-sectional view illustrating the structure of a liquid-crystal panel according to a fourth embodiment of the invention.

As shown in FIG. 12, a liquid-crystal panel 420R according to this embodiment has the same structure as in the first embodiment, except that a light-shielding portion is not disposed on an opposite substrate 403, and a common electrode 434 is directly disposed on the inner surface 403a of the opposite substrate 403 and covers grooves 440 of prismatic elements 430. The grooves 440 are hollow grooves. Thus, light-shielding portions 423 are disposed on a TFT-array substrate 402 alone.

Even when a light-shielding portion is not disposed on the opposite substrate 403, the distance between each prismatic element 430 and a corresponding one of the light-shielding portions 423 is reduced because the opposite substrate also serves as the prismatic substrate. Thus, among light rays which pass through pixel regions and are then absorbed in the light-shielding portions 423 when a prismatic substrate is bonded to the outer side of an opposite substrate, some of the light rays are not absorbed in this embodiment. Furthermore, light-transmitting regions are substantially large compared with the case in which the prismatic substrate is bonded on the outer side of the opposite substrate, thereby improving efficiency for light utilization.

The technical range of the invention is not limited to the embodiments. Various modifications may be made without departing from the scope of the invention.

In the above-described embodiments, the liquid-crystal devices are exemplified as electro-optical devices. However, the invention is not limited thereto. The invention may also be applied to other electro-optical devices, such as organic EL devices, inorganic EL devices, plasma displays, electrophoretic displays, and field-emission displays.

In the fourth embodiment, the liquid-crystal panel 420R including the prismatic elements 430 having the hollow grooves 440 is exemplified in the same way as in the first embodiment. Alternatively, a filling having a refractive index lower than that of the opposite substrate 403 may be disposed in the grooves 440 (see the second embodiment. Furthermore, a filling containing a reflective material may be disposed in the grooves 440.

What is claimed is:

1. An electro-optical device comprising:
    a first substrate;
    a second substrate;
    an electro-optical material disposed between the first and second substrates;
    a prismatic portion that collects light incident on the first substrate, the prismatic portion being in the form of a groove, the groove including a pair of inclined surfaces being formed in a surface of the first substrate, the surface being adjacent to the electro-optical material, an intersection of the pair of inclined surfaces defining an acute angle such that the acute angle opens towards the electro-optical material;
    a functional layer that drives the electro-optical material, the functional layer being formed on the surface of the first substrate and the functional layer directly contacting and covering the first substrate and covering the opening of the groove of the prismatic portion, wherein the functional layer is substantially uniformly transparent and does not protrude into the first substrate, the groove of the prismatic portion and the electro-optical material; and
    a light-shielding portion disposed on the second substrate, the light-shielding portion overlapping the prismatic portion when viewed in plan.

2. The electro-optical device according to claim 1, wherein the electro-optical material has a higher refractive index than that of the first substrate.

3. The electro-optical device according to claim 1, wherein the prismatic portion is in the form of a hollow groove.

4. The electro-optical device according to claim 1, wherein a filling having a lower refractive index than that of the first substrate is disposed in the groove of the prismatic portion.

5. A projector comprising:
    the electro-optical device according to claim 1.

6. The electro-optical device according to claim 1, further comprising:
    a transistor disposed between the light-shielding portion and the second substrate, the transistor overlapping the prismatic portion and the light-shielding portion in plain view.

7. The electro-optical device according to claim 1, wherein the functional layer has a substantially uniform thickness with respect to the first substrate.

* * * * *